July 3, 1934.                F. C. WERNER                1,964,969
COOKY PRESS
Filed Jan. 11, 1932
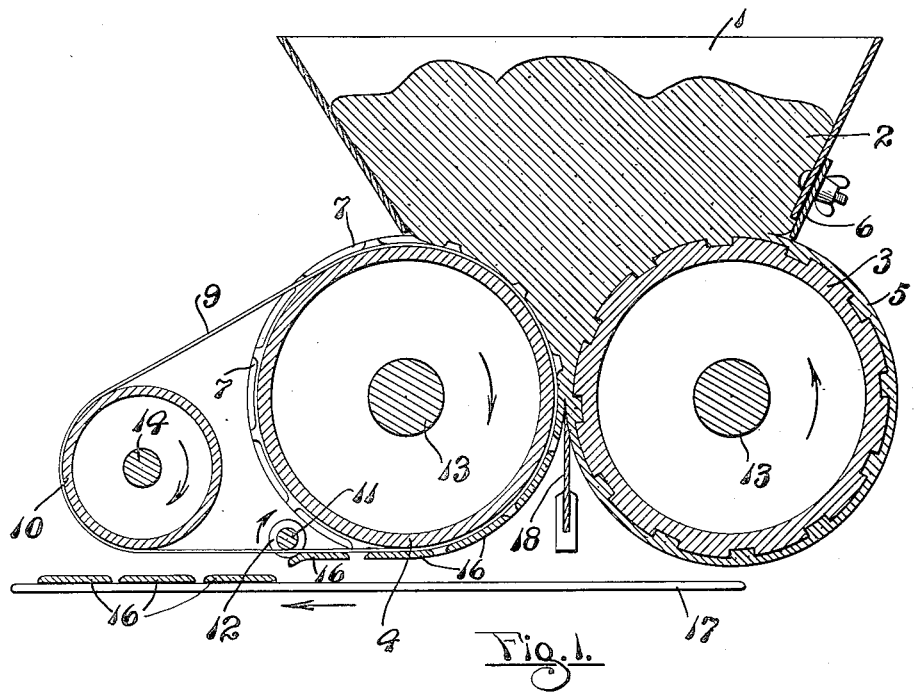
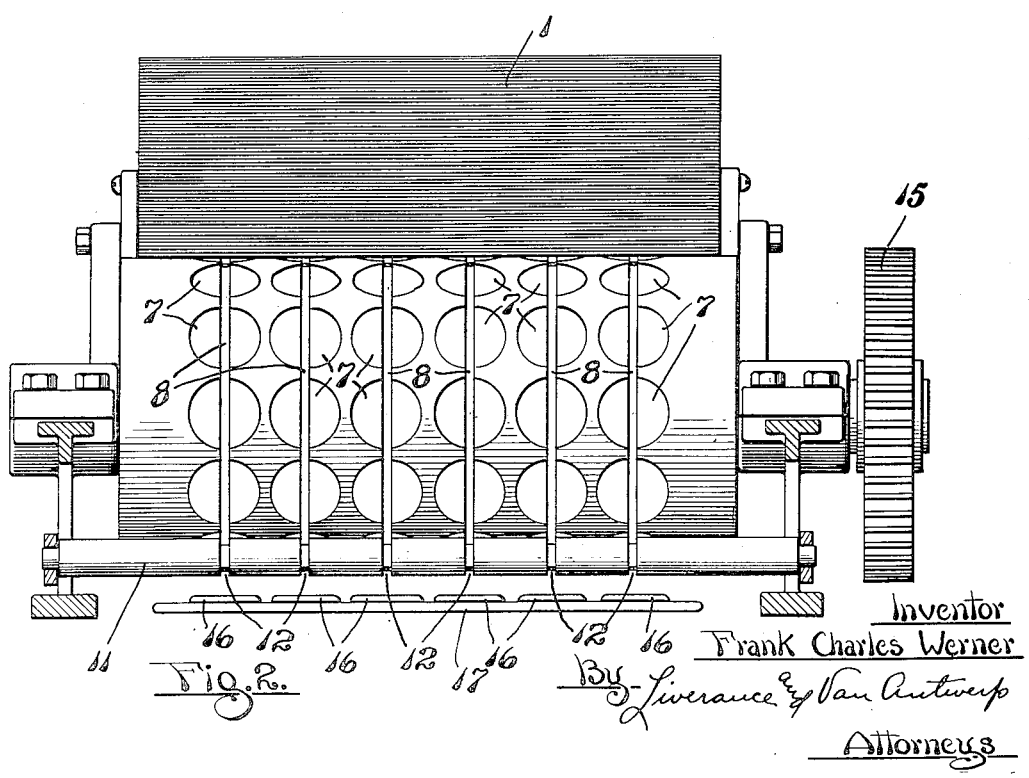
Inventor
Frank Charles Werner
By Liverance & Van Antwerp
Attorneys Patented July 3, 1934

1,964,969

UNITED STATES PATENT OFFICE 1,964,969

COOKY PRESS

Frank Charles Werner, Grand Rapids, Mich.

Application January 11, 1932, Serial No. 585,838

1 Claim. (Cl. 107—8)

This invention relates to cooky presses, and is particularly concerned with a novel construction whereby dough in a mass may be quickly and easily shaped and formed into cooky forms and deposited on pans which may be inserted in an oven for baking without waste of dough, this being accomplished very rapidly and efficiently.

The invention is concerned with many novel constructions and improvements in connection with machines of this character, including a novel means for positively assuring that the dough, shaped and pressed into the desired form, may be effectively removed from dies or depressions in a roller, and in all cases separated from the roller and from the bands which pass around the roller to effect such separation, insurance against the dough sticking to said bands being provided in a very simple and practical manner.

An understanding of the invention may be had from the following description, taken in connection with the accompanying drawing, in which, Fig. 1 is a vertical section illustrating the essential parts of the machine, and Fig. 2 is an elevation partly in section looking at the machine from the left of Fig. 1, with certain parts omitted to make a better disclosure.

Like reference characters refer to like parts in the two figures of the drawing.

In the construction of the machine a hopper 1, open at its upper side, is used in which to deposit the dough, indicated at 2, the hopper having downwardly inclined sides, the lower edges of which come above the upper sides of two rollers 3 and 4, the latter of which is a die roller having depressions into which the dough is pressed. The die depressions may be of any desired form and shape for different shapes and configurations of cookies. The roller 3 is longitudinally grooved and in its rotation, engaging against the dough 2, carries the same between itself and the die roller 4 which rotates in the opposite direction; and the roller 3 becomes coated at its outer side with a covering of dough 5 the thickness of which is dependent upon the adjustment of a gauge 6 carried by one of the sides of the hopper, as shown in Fig. 1.

The die roller 4 carries a large number of die depressions 7 which, as previously indicated, may be of any preferred form or of several different forms. Around the roller 4 a plurality of spaced apart continuous grooves 8 are made which cut across the die depressions 7 also made around the roller. A plurality of endless metal belts or bands 9 set in said grooves passing around the roller and also around roller 10 as shown in Fig. 1.

Between the rollers 4 and 10 a roller 11 of relatively small diameter is mounted which likewise has a plurality of spaced apart grooves 12 around it. The roller 11 is positioned above the lower runs of the bands or belts 9 and rests thereon, the bands being located in the grooves 12 as shown in Fig. 1.

The rollers 3 and 4 are carried on suitable shafts 13 and roller 10 on a shaft 14. Gearing connections, indicated at 15, connect the shafts 13 so as to drive the rollers 3 and 4 in opposite directions as indicated by the arrows. The dough coming to and filling the die recesses 7 lies over the bands or belts 9. With the continued rotation of roller 4 in the direction indicated the bands serve to lift the dough which has filled the depressions 7, carrying the same to the roller 11 whereupon the side portions of the cookies, riding upon the larger portions of the roller 11 at each side of the grooves 12, causes a separation of the cookies and the same drop by gravity as separate and distinct cookies 16, falling upon a pan 17 moving beneath the machine in the direction indicated in Fig. 1.

It will be apparent that dough will enter the grooves 8 between the die depressions 7 and hence the cookies will leave the die roller 4 in connected relationship. However, this connection is broken by the operation of my novel roller means 11. The roller 11 is rotated by contact between the belts 9 and the bottom surfaces of the grooves 12 therein and this causes the higher portions of the roller 11 to have a speed which is considerably greater than the speed of the belts 9 and also greater than the speed of the cookies 16.

The cookies 16 are carried against the outer surface of the roller 11, see Fig. 1, one after the other, and as the edge of the cooky comes against this surface, the increased speed of travel thereof causes the cooky to be drawn downwardly at an increased rate of speed and this causes a clean separation to occur between the belt 9 and the cooky. Also, this temporarily increased rate of travel causes the cooky, which is being acted upon by the roller 11, still referring to Fig. 1, to be pulled to the left and thus separated somewhat from the cooky immediately following the same. This separating movement causes the small connecting portion of dough between the cookies to be broken and hence the cookies are free to gravitate downwardly in periodic fashion and hence no overlapping will occur. That is, in machines such as that illustrated in the patent granted to Frank Werner, Patent No. 859,999, patented on July 16, 1907, no means is provided for causing the cookies to have an absolutely predetermined point at which their separating movement occurs but its operation is more or less haphazard and consequently considerable overlapping of the cookies is had and such results in waste as is readily understood by those skilled in this art. This waste sometimes runs as high as 10% whereas in my novel construction this is practically entirely eliminated.

Between the rollers 3 and 4 and at the lower sides thereof is a vertical knife 18 the edge of which is in close contact with the rounded cylindrical surface of the die roller 4, this cutting the dough which is fed and squeezed between the two rollers and separating each cooky 16 from the adjacent cookies so that they may be withdrawn from the die recesses 7, as shown in Fig. 1.

The construction described is one of practical and proven merit. The invention is defined in the appended claim and is to be considered comprehensive of all forms of structure coming within its scope.

I claim:

In combination, a die roller, said die roller having a number of rows of die recesses therein around the same, each of said rows having an annular groove around the roller below the bottom of said die recesses and between the sides thereof, means for providing said recesses with dough, means for driving the roller, a band around the die roller, said band seating in the groove, a second roller around which the band passes, and a grooved roller means lcoated adjacent the die roller and immediately above the band for the purpose of causing said portions of dough to leave their respective recesses, said grooves in the roller being of a predetermined depth.

FRANK CHARLES WERNER.